US010999836B2

(12) United States Patent
Oketani (10) Patent No.: US 10,999,836 B2
(45) Date of Patent: May 4, 2021

(54) BASE STATION, TERMINAL, RADIO COMMUNICATION SYSTEM, RADIO COMMUNICATION METHOD (71) Applicant: NEC CORPORATION, Tokyo (JP)

(72) Inventor: Kengo Oketani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/561,528

(22) PCT Filed: Jan. 5, 2016

(86) PCT No.: PCT/JP2016/000021
§ 371 (c)(1),
(2) Date: Sep. 26, 2017

(87) PCT Pub. No.: WO2016/157664
PCT Pub. Date: Oct. 6, 2016

(65) Prior Publication Data
US 2018/0070354 A1    Mar. 8, 2018

(30) Foreign Application Priority Data

Mar. 31, 2015  (JP) .............................. JP2015-071617

(51) Int. Cl.
H04W 72/04    (2009.01)
H04L 5/00     (2006.01)
(Continued)

(52) U.S. Cl.
CPC ....... H04W 72/0446 (2013.01); H04L 5/0096 (2013.01); H04L 27/2607 (2013.01);
(Continued)

(58) Field of Classification Search
CPC ..................................................... H04W 28/06
See application file for complete search history.

(56) References Cited

U.S. PATENT DOCUMENTS 8,503,366 B2 *  8/2013  Ikeda ................. H04L 27/2607
                                              370/328
9,591,632 B2 *  3/2017  Yi ......................... H04L 1/0046
(Continued)

FOREIGN PATENT DOCUMENTS

JP    2007-221743 A    8/2007
JP    2009-518966 A    5/2009
(Continued)

OTHER PUBLICATIONS

Shuichi Ohno, "Performance of Single-Carrier Block Transmissions Over Multipath Fading Channels with Linear Equalization", IEEE Transactions on Signal Processing, Oct. 2006, pp. 3678-3687, vol. 54, No. 10.
(Continued)

Primary Examiner — Rhonda L Murphy (57) ABSTRACT

A base station capable of reducing subframe overhead and improving throughput is provided. A base station (10) communicates with terminals (20-0 to 20-3). The base station (10) includes: a controller (12) configured to set, in a variable manner, for each subframe, a cyclic prefix length of a cyclic prefix part to be inserted into the subframe; and a communication unit (11) configured to transmit identification information for identifying the cyclic prefix length set in the subframe by the controller (12) to a terminal to which the subframe has been allocated.

16 Claims, 6 Drawing Sheets (51) Int. Cl.
*H04L 27/26* (2006.01)
*H04W 28/06* (2009.01)
*H04W 88/02* (2009.01)

(52) U.S. Cl.
CPC ........... *H04W 28/06* (2013.01); *H04W 72/04* (2013.01); *H04W 72/042* (2013.01); *H04W 88/02* (2013.01); *H04L 5/0023* (2013.01); *H04L 27/2646* (2013.01); *H04L 27/2666* (2013.01)

(56) References Cited

U.S. PATENT DOCUMENTS

| | | | | |
|---|---|---|---|---|
| 2009/0109914 | A1* | 4/2009 | McBeath | H04W 72/042 370/329 |
| 2009/0323642 | A1* | 12/2009 | Tanno | H04B 1/7075 370/336 |
| 2013/0315321 | A1 | 11/2013 | Rajagopal et al. | |
| 2015/0131749 | A1* | 5/2015 | Slomina | H04J 11/005 375/260 |
| 2016/0127140 | A1 | 5/2016 | Seo et al. | |
| 2019/0013982 | A1* | 1/2019 | Sun | H04L 5/0007 |

FOREIGN PATENT DOCUMENTS

| | | |
|---|---|---|
| JP | 2010-016825 A | 1/2010 |
| JP | 2010-081446 A | 4/2010 |
| JP | 2010-110022 A | 5/2010 |
| JP | 2010-516066 A | 5/2010 |
| JP | 2014-529229 A | 10/2014 |
| WO | 2009/072171 A1 | 6/2009 |
| WO | 2009/133742 A1 | 11/2009 |
| WO | 2013/010247 A1 | 1/2013 |
| WO | 2014/073865 A1 | 5/2014 |
| WO | 2014/112907 A1 | 7/2014 |
| WO | 2014/182105 A1 | 11/2014 |

OTHER PUBLICATIONS

International Search Report for PCT/JP2016/000021 dated Mar. 29, 2016 [PCT/ISA/210].
Written Opinion for PCT/JP2016/000021 dated Mar. 29, 2016 [PCT/ISA/237].
Extended European Search Report dated Nov. 6, 2018 issued by the European Patent Office in counterpart application No. 16771561.4.
Decision to Grant a Patent dated Jun. 16, 2020, from the Japanese Patent Office in Application No. 2019-080794.

* cited by examiner

| CP LENGTH IDENTIFIER | CP LENGTH [μs] |
|---|---|
| 0 | 0.0625 |
| 1 | 0.046875 |
| 2 | 0.03125 |
| 3 | 0.015625 |

BASE STATION, TERMINAL, RADIO COMMUNICATION SYSTEM, RADIO COMMUNICATION METHOD

CROSS REFERENCE TO RELATED APPLICATIONS

This application is a National Stage of International Application No. PCT/JP2016/000021 filed Jan. 5, 2016, claiming priority based on Japanese Patent Application No. 2015-071617 filed Mar. 31, 2015, the contents of all of which are incorporated herein by reference in their entirety.

TECHNICAL FIELD

The present invention relates to a base station, a terminal, a radio communication system, and a radio communication method.

BACKGROUND ART

In recent years, with the explosive spread of high-function terminals such as smartphones, tablets or the like, a dramatic increase in network capacity in mobile networks has been required. Accordingly, in communication standards called Long Term Evolution (LTE) or LTE-advanced (LTE indicates Release 8 and the subsequent Releases of the 3rd Generation Partnership Project (3GPP)), standards to meet the requirements for expansion of network capacity have been defined. Specifically, as a communication scheme for further improving the frequency usage efficiency, Orthogonal Frequency Division Multiplexing (OFDM) has been employed for downlink communication and standards such as carrier aggregation capable of performing transmission and operation of a plurality of carriers collectively have been defined. However, a combination of these techniques alone cannot meet the requirements for the recent expansion of network capacity. Therefore, a further expansion of network capacity in 5G (Fifth Generation), which is the next generation communication standard, will be discussed. 3GPP, which is a standardization group, will start a discussion about 5G from about 2016 in order to achieve commercialization thereof in about 2020.

In order to achieve a dramatic expansion of network capacity in the mobile networks, besides frequency bands of hundreds of megahertz and several gigahertz that are currently being used, a higher frequency band like tens of gigahertz needs to be used. When 5G is used in the future, it is expected that Massive Multiple Input Multiple Output (MIMO) or the like in which signals are transmitted using transmission beams targeted in the direction of a user using a large number of antennas will be employed, which means that number of antennas will be dramatically increased. On the other hand, in the current LTE specification, as described above, the OFDM has been employed as a downlink communication scheme. In general, however, the OFDM is a communication scheme in which the Peak to Average Power Ratio (PAPR), which indicates the ratio of the peak power to the average power of the transmission signal, is large. Accordingly, if the communication scheme such as OFDM in which the PAPR is large is employed when a large number of antennas are used, there is a problem that the power consumption of the whole transmission system becomes extremely large. Further, in general, in the OFDM, frequency band packet scheduling that uses variation for each user of the propagation path in the frequency band is applied. The frequency band packet scheduling is a method of allocating, for each user, a frequency band in which the state of a propagation path of the user is good (=which is optimal for the user) for data transmission and simultaneously multiplexing a plurality of users. This method is generally considered to have a multi-user diversity effect, that is, this method is considered to contribute to improvement of throughput of the whole system. On the other hand, however, this method causes a further increase in PAPR since it multiplexes a plurality of users in one time resource. Accordingly, in a system in which a large number of antennas are used or a system in which services are provided for a relatively small number of users in a small cell, for example, it is more desirable to obtain an effect that the PAPR can be reduced than to obtain the multi diversity effect which is achieved by multiplexing a plurality of users. Accordingly, in these types of systems, it can be considered that a scheduling system in which PAPR can be made low (=the number of users simultaneously multiplied is small) or a single carrier transmission scheme in which PAPR is low (=power consumption is low) is suitable. Therefore, in 5G, it is highly likely that a single carrier transmission scheme, which is a communication scheme in which PAPR is very small, will be considered as a candidate for the downlink communication scheme. More specifically, a zero-padding cyclic prefix single carrier transmission scheme or a null cyclic prefix single carrier transmission scheme may be used (the zero-padding cyclic prefix single carrier transmission scheme and the null cyclic prefix single carrier transmission scheme are disclosed, for example, in Non-Patent Literature 1). By using these single carrier transmission schemes, it becomes possible to increase the network capacity while suppressing the power consumption. The cyclic prefix may be herein abbreviated as CP (Cyclic Prefix).

Figure 1:
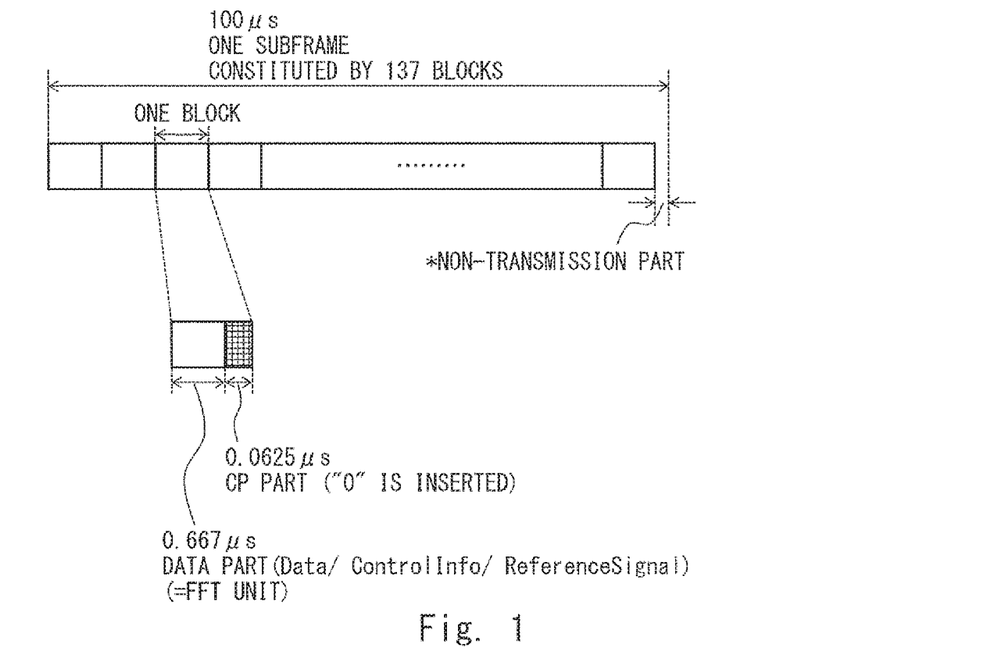
FIG. 1 is a diagram showing a configuration example of a subframe in a zero-padding cyclic prefix single carrier transmission scheme according to a related art.
Figure 2:
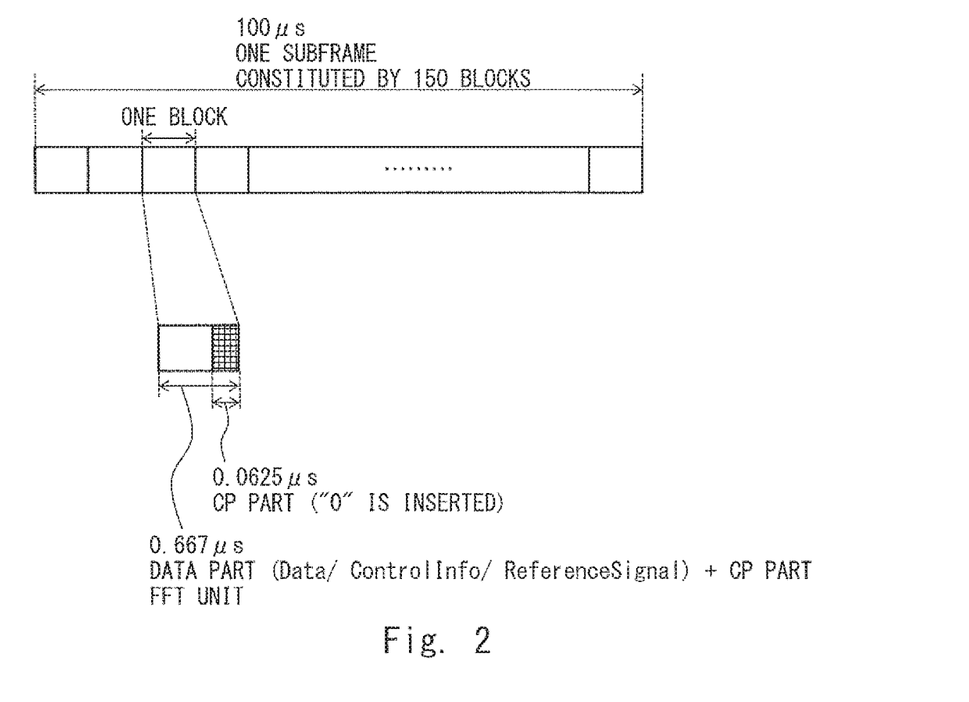
FIG. 2 is a diagram showing a configuration example of a subframe in a null cyclic prefix single carrier transmission scheme according to a related art.

FIG. 1 shows a configuration example of a subframe according to a zero-padding cyclic prefix single carrier transmission scheme. FIG. 2 shows a configuration example of a subframe according to a null cyclic prefix single carrier transmission scheme. In this example, it is assumed that the subframe indicates a minimum unit of time resources to be allocated to a user. It is further assumed that the sampling period is 3072 M sample/s, which corresponds to 100 times the bandwidth of the 20 MHz system of LTE. The subframe length is set to be 100 μs, which is one tenth of the radio frame length of LTE. Further, the size of Fast Fourier Transform (FFT) is 2048.

With reference to FIG. 1, in the zero-padding cyclic prefix single carrier transmission scheme in this example, each block that constitutes the subframe includes a data part having a length of an FFT unit (in this example, an FFT unit length has a length of 0.667 (=⅔) μs) and a CP part inserted after the data part (in this example, the CP length has a length of 0.0625 μs). The connection of 137 blocks constitutes one subframe. The data part is a part in which Data, control information, or a reference signal is transmitted. Further, 0 is inserted into the CP part in this example, assuming that this part is a non-transmission period. Further, the last part having a length of about 0.1 μs remains as a non-transmission part.

Further, with reference to FIG. 2, in the null cyclic prefix single carrier transmission scheme in this example, each block that constitutes the subframe has a length of the FFT unit and both the data part and the CP part are included in this FFT unit. The connection of 150 blocks constitutes one subframe.

While it is assumed that the CP part is the non-transmission period in the examples shown in FIGS. 1 and 2, a part of the data part previous to the CP part may be repeatedly transmitted. Further, while the CP part is inserted after the data part, it may be inserted before the data part.

In general, the length of a delay wave of a radio signal is determined in accordance with the usage frequency band, the distance from the base station to the user's terminal, or various other factors. In this example, for the sake of convenience of the explanation, the maximum value (the worst value) of the length of the delay wave of the radio signal is assumed to be 0.06 μs. In this case, the minimum CP length that is necessary in order for inter-block interference with respect to this worst value not to occur is 0.06 μs. In systems like LTE which presuppose multiplexing of a plurality of users with respect to one time resource, the CP length needs to be set in accordance with this worst value for the system operation. Based on this idea, the CP length is set to be 0.0625 μs, which is obtained by adding a margin 0.0025 μs to the worst value (0.06 μs) in the examples shown in FIGS. 1 and 2. While the CP is necessary to suppress inter-block interference, the CP causes overhead and a decrease in throughput. In the examples shown in FIGS. 1 and 2, the percentage of overhead of CP in one block becomes large as shown below.

Zero-padding cyclic prefix single carrier transmission scheme 0.0625/(0.667+0.0625)=8.6%
Null cyclic prefix single carrier transmission scheme 0.0625/0.667=9.4%

Related art in which the CP length of the CP part is set is disclosed, for example, in Patent Literature 1 to 4.

CITATION LIST

Patent Literature

[Patent Literature 1] Japanese Unexamined Patent Application Publication No. 2010-081446
[Patent Literature 2] Japanese Unexamined Patent Application Publication No. 2010-110022
[Patent Literature 3] Published Japanese Translation of PCT International Publication for Patent Application, No. 2010-516066
[Patent Literature 4] International Patent Publication No. WO 2009/072171

Non-Patent Literature

[Non-Patent Literature 1] Shuichi Ohno, "Performance of Single-Carrier Block Transmissions Over Multipath Fading Channels With Linear Equalization", IEEE TRANSACTIONS ON SIGNAL PROCESSING, VOL. 54, NO. 10, OCTOBER 2006

SUMMARY OF INVENTION

Technical Problem

As described above, in the examples shown in FIGS. 1 and 2, the CP length is fixed to a value in accordance with the worst value of the length of the delay wave of the radio signal, which causes the percentage of overhead to become extremely large. Therefore, the data length of the data part that can be used for transmission of data or the like becomes short, which causes a problem that throughput of the whole system is reduced.

One object of the present invention is to provide a base station, a terminal, a radio communication system, and a radio communication method capable of solving the aforementioned problem, reducing subframe overhead, and improving throughput of the whole system.

Solution to Problem

In one aspect, a base station communicates with a terminal. The base station includes: a controller configured to set, in a variable manner, for each subframe, a cyclic prefix length of a cyclic prefix part to be inserted into the subframe; and a communication unit configured to transmit identification information for identifying the cyclic prefix length set in the subframe by the controller to the terminal to which the subframe has been allocated.

In one aspect, a terminal communicates with a base station. The base station sets, in a variable manner, for each subframe, a cyclic prefix length of a cyclic prefix part to be inserted into the subframe. The terminal includes a communication unit configured to receive identification information for identifying the cyclic prefix length set in the subframe allocated to the terminal from the base station.

In one aspect, a radio communication system includes a terminal and a base station configured to communicate with the terminal. The base station includes: a controller configured to set, in a variable manner, for each subframe, a cyclic prefix length of a cyclic prefix part to be inserted into the subframe; and a communication unit configured to transmit identification information for identifying the cyclic prefix length set in the subframe by the controller to the terminal to which the subframe has been allocated.

In one aspect, a radio communication method is a radio communication method by a base station configured to communicate with a terminal. The radio communication method includes: setting, in a variable manner, for each subframe, a cyclic prefix length of a cyclic prefix part to be inserted into the subframe; and transmitting identification information for identifying the cyclic prefix length set in the subframe to the terminal to which the subframe has been allocated.

In one aspect, a radio communication method is a radio communication method by a terminal configured to communicate with a base station. The base station sets, in a variable manner, for each subframe, a cyclic prefix length of a cyclic prefix part to be inserted into the subframe. The radio communication method includes receiving identification information for identifying the cyclic prefix length set in the subframe allocated to the terminal from the base station.

Advantageous Effects of Invention

According to the aforementioned aspects, it is possible to reduce subframe overhead and to improve throughput of the whole system.

DESCRIPTION OF EMBODIMENTS

Hereinafter, with reference to the drawings, embodiments of the present invention will be described.

(1) First Embodiment

Figure 3:
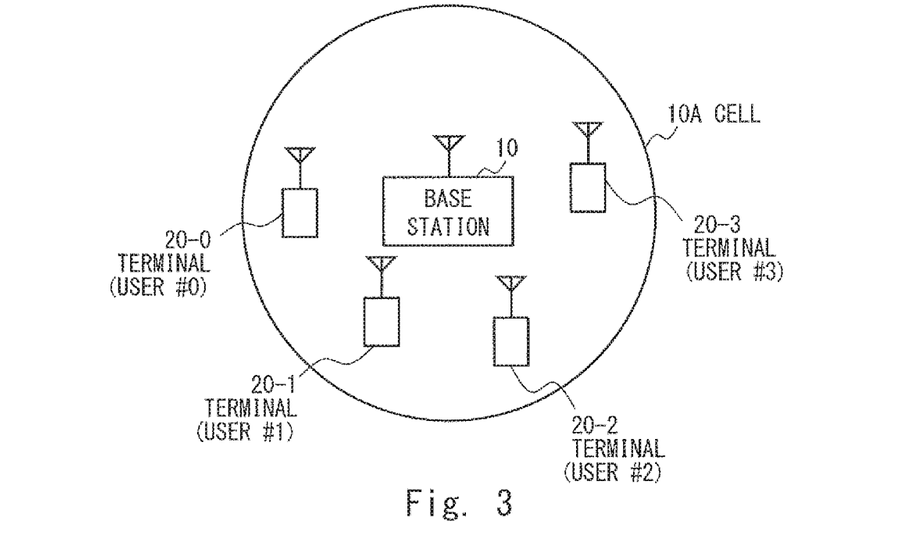
FIG. 3 is a diagram showing a configuration example of a radio communication system according to first to fifth embodiments.

FIG. 3 shows a configuration example of a radio communication system according to this embodiment. With reference to FIG. 3, the radio communication system according to this embodiment includes a base station 10 and terminals 20-0 to 20-3 of users #0 to #3, respectively. The base station 10 and the terminals 20-0 to 20-3 perform uplink communication and downlink communication. A case in which the four terminals 20-0 to 20-3 (four users #0 to #3) are present in a cell 10A of the base station 10 is assumed in FIG. 3, but the number of terminals (users) is not limited to four. Further, in the following description, the terminals 20-0 to 20-3 may be described as a terminal 20 unless a particular terminal is mentioned.

Figure 4:
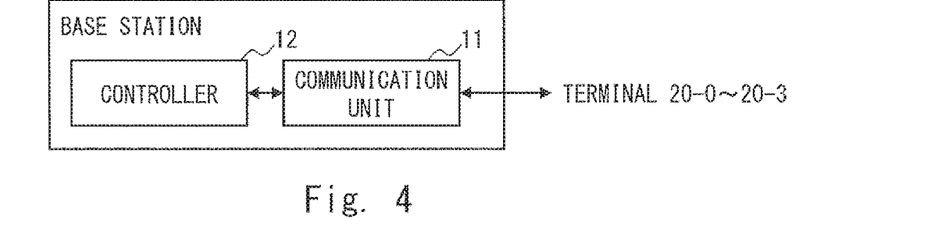
FIG. 4 is a diagram showing a configuration example of a base station according to the first embodiment.

FIG. 4 shows a configuration example of the base station 10 according to this embodiment. With reference to FIG. 4, the base station 10 according to this embodiment includes a communication unit 11 and a controller 12. The controller 12 sets, for each subframe, a CP length of a CP part to be inserted into this subframe in a variable manner. While it is assumed that the CP part is periodically inserted into the subframe, it may be inserted aperiodically. Further, the subframe in which the CP length is set in the variable manner may either be a subframe for uplink communication or a subframe for downlink communication. When the subframe for uplink communication is used, a notification regarding the CP length set in this subframe needs to be sent to the terminal 20 to which this subframe has been allocated. When the subframe for downlink communication is used as well, a notification regarding the CP length set in this subframe needs to be sent to the terminal 20 to which this subframe has been allocated. Otherwise, the terminal 20 cannot determine at which part data or the like is to be transmitted and cannot determine the timing when the FFT is to be executed. The communication unit 11 therefore transmits identification information for identifying the CP length set in the subframe by the controller 12 to the terminal 20 to which this subframe has been allocated. The communication unit 11 also performs reception of data or the like in the data part to be inserted into the subframe for uplink communication and transmission of data or the like in the data part to be inserted into the subframe for downlink communication. Further, the CP part may be inserted either before or after the data part.

Figure 5:
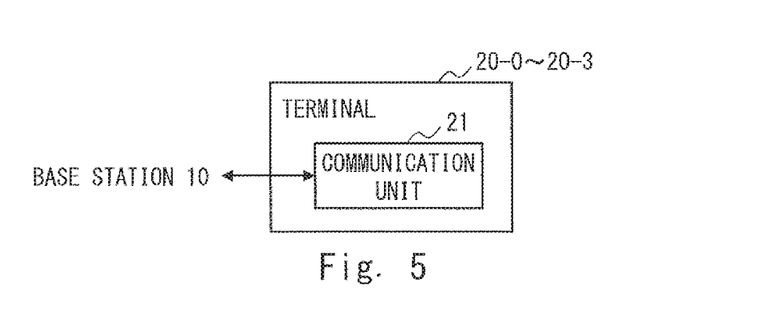
FIG. 5 is a diagram showing a configuration example of a terminal according to the first embodiment.

FIG. 5 shows a configuration example of the terminals 20-0 to 20-3 according to this embodiment. With reference to FIG. 5, the terminals 20-0 to 20-3 according to this embodiment include a communication unit 21. The communication unit 21 receives, from the base station 10, identification information for identifying the CP length set in the subframe allocated to its own terminal 20. The communication unit 21 also performs transmission of data or the like in the data part to be inserted into the subframe for uplink communication and reception of data or the like in the data part to be inserted into the subframe for downlink communication.

Figure 6:
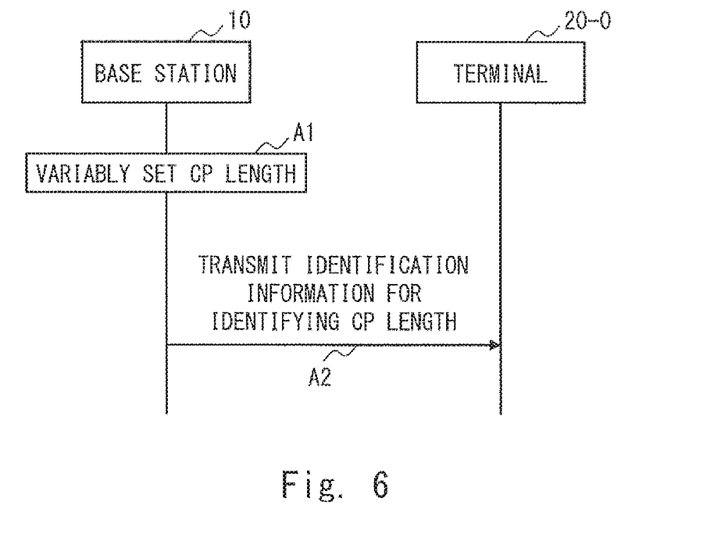
FIG. 6 is a sequence diagram showing an operation example of the radio communication system according to the first embodiment.

In the following description, with reference to FIG. 6, an operation example of the radio communication system according to this embodiment will be described. In this example, an operation performed between the base station 10 and the terminal 20-0 will be described as an example. Referring to FIG. 6, the controller 12 of the base station 10 sets, in the variable manner, the CP length of the CP part to be inserted into the subframe that has been allocated to the terminal 20-0 (Step A1). The communication unit 11 of the base station 10 transmits identification information for identifying the CP length set in the subframe by the controller 12 to the terminal 20-0 (Step A2). This identification information is received by the communication unit 21 of the terminal 20-0. When the CP length of the subframe for downlink communication has been set in the variable manner, the base station 10 performs transmission of data or the like in accordance with the CP length set in this subframe in the following processes. On the other hand, when the CP length of the subframe for uplink communication has been set in the variable manner, the terminal 20-0 performs transmission of data or the like in accordance with the CP length set in this subframe in the following processes.

As described above, in this embodiment, the base station 10 sets, in the variable manner, for each subframe, the CP length of the CP part to be inserted into the subframe. Further, the base station 10 transmits the identification information for identifying the CP length set in the subframe to the terminal 20 to which this subframe has been allocated. It is therefore possible to shorten, for example, the CP length of the subframe to be allocated to the specific terminal 20. Accordingly, it is possible to reduce subframe overhead and increase the data length of the data part that can be used for transmission of data or the like, whereby it is possible to improve effective throughput in the whole system.

(2) Second Embodiment

This embodiment is an example in which the configurations and the operations of the first embodiment are further specified. While the whole configuration of the radio communication system according to this embodiment is similar to that of the first embodiment in FIG. 3, the configurations of the base station 10 and the terminals 20-0 to 20-3 in this embodiment are different from those in the first embodiment.

Figure 7:
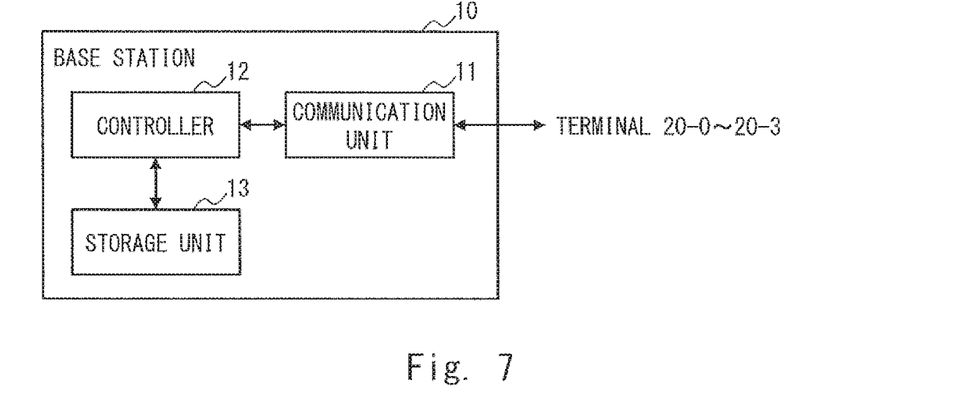
FIG. 7 is a diagram showing a configuration example of a base station according to the second to fifth embodiments.

FIG. 7 shows a configuration example of the base station 10 according to this embodiment. With reference to FIG. 7, the base station 10 according to this embodiment further includes a storing unit 13 in addition to the components in the first embodiment shown in FIG. 4. In this embodiment, as will be described later, a CP length identifier associated with the CP length is used as the identification information for identifying the CP length set in the subframe by the controller 12. The storing unit 13 stores a CP length correspondence table (see FIG. 9 described later) or the like indicating a CP length identifier and the CP length corresponding to the CP length identifier.

Figure 8:
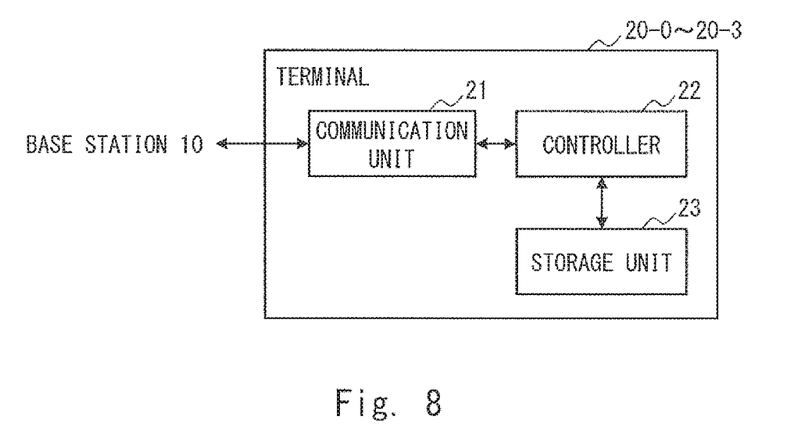
FIG. 8 is a diagram showing a configuration example of a terminal according to the second to fifth embodiments.

FIG. 8 shows a configuration example of the terminals 20-0 to 20-3 according to this embodiment. With reference to FIG. 8, the terminals 20-0 to 20-3 according to this embodiment further include a controller 22 and a storing unit 23 in addition to the components of the first embodiment shown in FIG. 5. The storing unit 23 stores the aforementioned CP length correspondence table (see FIG. 9 described later) and the like. Upon receiving the CP length identifier from the base station 10, the controller 22 refers to the CP length correspondence table stored in the storing unit 23 and determines the CP length corresponding to the CP length identifier received from the base station 10.

Hereinafter, operations of the radio communication system according to this embodiment will be explained. In this embodiment, it is assumed that the downlink communication from the base station 10 to the terminals 20-0 to 20-3 is performed and the CP length of the subframe for downlink communication is set in the variable manner. Further, it is assumed that the aforementioned zero-padding cyclic prefix single carrier transmission scheme is used as the communication scheme. Further, it is assumed that the sampling period, the subframe length, the FFT size and the like are the same as those shown in FIGS. 1 and 2.

Figure 9:
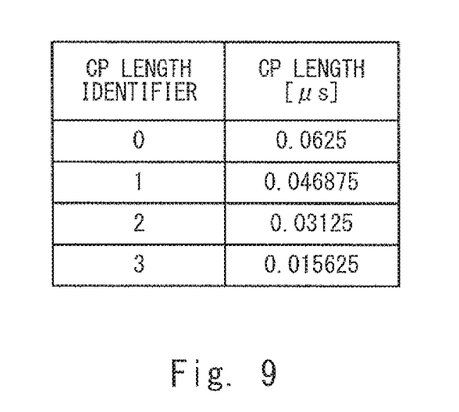
FIG. 9 is a diagram showing one example of a CP length correspondence table indicating a CP length that can be set in the subframe and a CP length identifier corresponding to this CP length according to the second to fifth embodiments.
Figure 10:
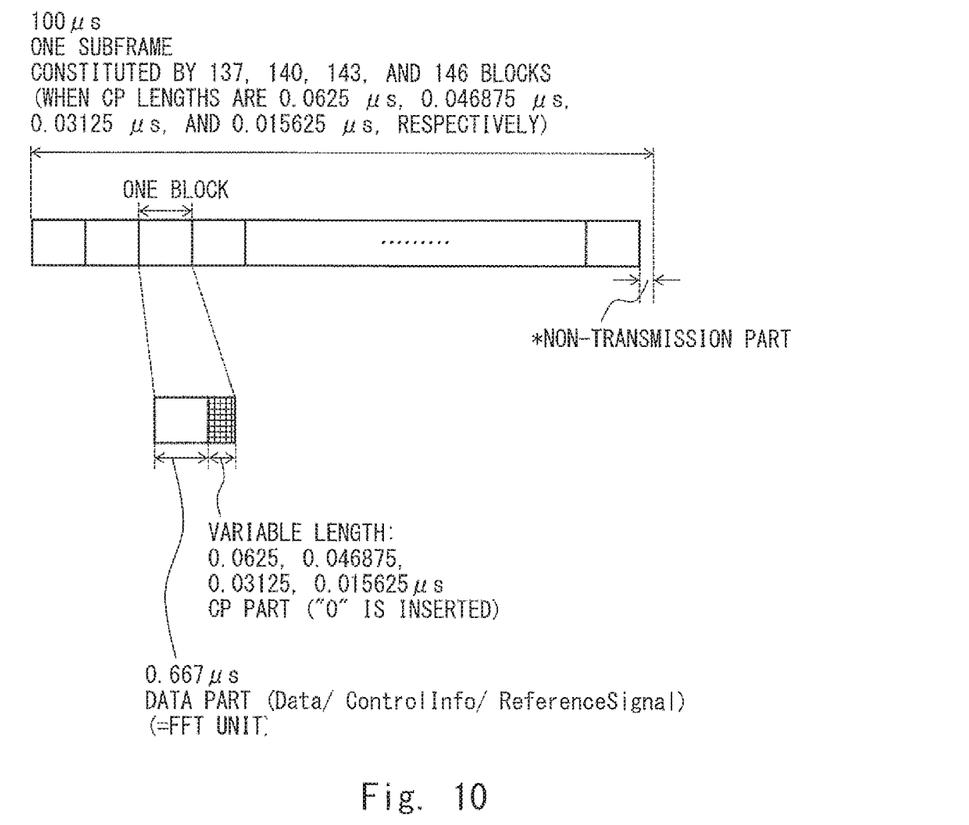
FIG. 10 is a conceptual diagram showing a schematic configuration example of a subframe in a zero-padding cyclic prefix single carrier transmission scheme according to the second to fifth embodiments.
Figure 11:
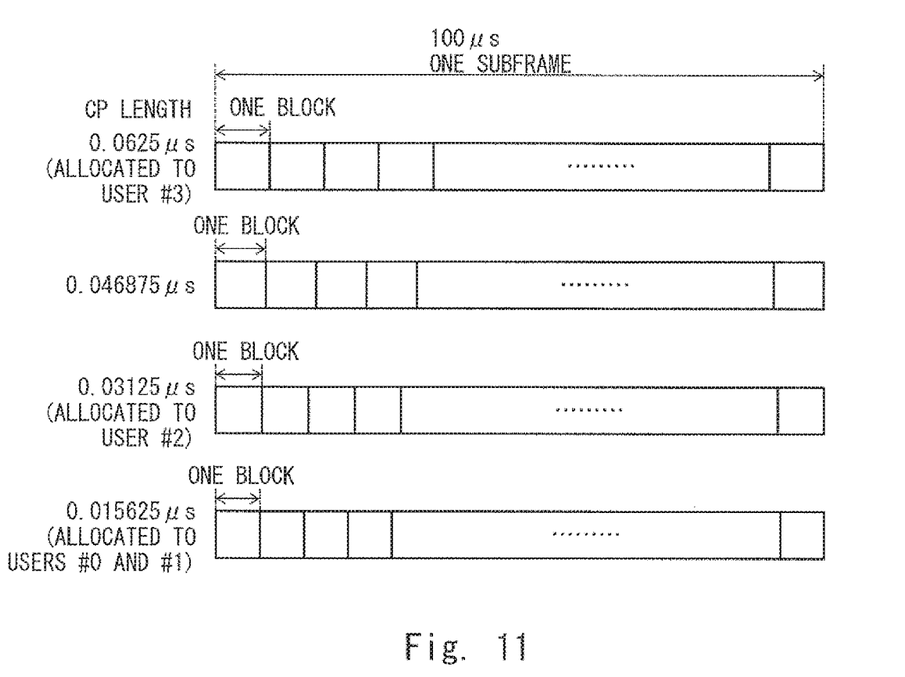
FIG. 11 is an image diagram showing a specific configuration example of a subframe in the zero-padding cyclic prefix single carrier transmission scheme according to the second to fifth embodiments.

FIG. 9 shows one example of the CP length correspondence table indicating the CP length that can be set in the subframe and the CP length identifier corresponding to this CP length according to this embodiment. FIG. 10 shows a schematic configuration example of the subframe according to this embodiment and FIG. 11 shows a specific configuration example of the subframe according to this embodiment. With reference to FIG. 9, in this embodiment, the CP length is switched in four steps and each step is switched by 0.0625/4=0.015625 µs, which is obtained by dividing the CP length 0.0625 µs fixedly set in the examples shown in FIGS. 1 and 2 into four. That is, the controller 12 of the base station 10 is able to set four values 0.0625 µs, 0.046875 µs, 0.03125 µs, and 0.015625 µs as the CP length of the CP part. Further, it is assumed that the CP length identifiers 0, 1, 2, and 3 are respectively allocated to the CP lengths 0.0625 µs, 0.046875 µs, 0.03125 µs, and 0.015625 µs. With reference to FIG. 10, for each subframe, one of the four CP lengths is set in the CP part of each block of the subframe. However, a change in the CP length causes a change in the block length of each block, which causes a change in the number of blocks constituting the subframe. Therefore, when the CP lengths are 0.0625 µs, 0.046875 µs, 0.03125 µs, and 0.015625 µs, the numbers of blocks that constitute the subframe become 137, 140, 143, and 146, respectively. While 0 is inserted into the CP part, which is assumed to be the non-transmission period, in FIG. 10, a part of the previous data part may be repeatedly transmitted. Further, while the CP part is inserted after the data part, it may be inserted before the data part. Further, FIG. 11 shows a specific image diagram of the respective subframes when four CP lengths have been set.

Further, in this embodiment, it is assumed that there are four terminals 20-0 to 20-3 (four users #0 to #3) in the cell 10A of the base station 10 and subframes #0 to #3 are respectively allocated to the four terminals 20-0 to 20-3. That is, it is assumed that data or the like for the terminal 20-0 is transmitted in the subframe #0, data for the terminal 20-1 is transmitted in the subframe #1, data or the like for the terminal 20-2 is transmitted in the subframe #2, and data or the like for the terminal 20-3 is transmitted in the subframe #3. Further, it is assumed that the lengths of the delay waves of downlink radio signals between the base station 10 and the four terminals 20-0 to 20-3 are 0.015 µs, 0.015 µs, 0.03 µs, and 0.06 µs, respectively. The length of the delay wave of the downlink radio signal can be obtained by a desired method. The controller 12 of the base station 10 performs, for example, channel estimation (propagation path estimation) processing every time it receives an uplink radio signal. According to this processing, the length of the delay wave of the uplink radio signal can be obtained. Further, the length of the delay wave of the uplink radio signal and that of the downlink radio signal are generally considered to be substantially the same. Therefore, the controller 12 of the base station 10 may use the length of the delay wave of the uplink radio signal obtained by the aforementioned channel estimation processing as the delay wave of the downlink radio signal.

Based on the aforementioned premise, the controller 12 of the base station 10 performs scheduling for each of the subframes #0 to #3. For example, the subframe #0 is allocated to the terminal 20-0 and the length of the delay wave of the downlink radio signal between the base station 10 and the terminal 20-0 is 0.015 µs. Further, according to the CP length correspondence table shown in FIG. 9, among the CP lengths longer than 0.015 µs, the minimum CP length is 0.015625 µs. Therefore, the controller 12 of the base station 10 determines, in the scheduling of the subframe #0, in accordance with the CP length correspondence table shown in FIG. 9, the CP length of the CP part of the subframe #0 to be 0.015625 µs. Accordingly, the data length of the data part of the subframe #0 is also determined. In a similar way, the controller 12 of the base station 10 determines the CP length of the CP part of the subframe #1, the CP length of the CP part of the subframe #2, and the CP length of the CP part of the subframe #3 to be 0.015625 µs, 0.03125 µs, and 0.0625 µs, respectively. Accordingly, the subframes #0 and #1 are configured as shown at the bottom of FIG. 11, the subframe #2 is configured as shown in the second subframe from the bottom of FIG. 11, and the subframe #3 is configured as shown at the top of FIG. 11.

As a result, the average percentage of overhead of the cyclic prefix in one block in the subframes #0 to #3 is expressed as follows.

$$(0.015625+0.015625+0.03125+0.0625)/4/0.667=4.6875\%$$

Accordingly, in this embodiment, compared to the case in which the CP length is a fixed value 0.0625 µs (in this case, the aforementioned percentage is 8.6%) shown in FIGS. 1 and 2, overhead can be reduced by about half. Further, the numbers of blocks in one subframe when the CP lengths are 0.0625 µs, 0.046875 µs, 0.03125 µs, and 0.015625 µs are 137, 140, 143, and 146, respectively. It will be understood that an increase in the number of blocks causes an increase in the data length of the data part that can be used for transmission of data or the like. Accordingly, in view of effective data throughput, compared to the case in which the CP length is a fixed value 0.0625 µs, when the CP lengths are 0.046875 µs, 0.03125 µs, and 0.015625 µs, throughput can be improved by 2.2%, 4.4%, and 6.6%, respectively.

When the CP length is set for each subframe (in this example, it can also be said "for each terminal (user)") in the variable manner, a notification regarding the CP length that the controller 12 of the base station 10 has set needs to be sent to the terminal 20 to which this subframe has been allocated. Otherwise, the terminal 20 cannot determine at which part data or the like is to be transmitted and cannot determine the timing when the FFT is to be executed. Accordingly, the communication unit 11 of the base station 10 transmits, to the terminal 20, the 2-bit CP length identifier corresponding to the CP length that the controller 12 has set shown in FIG. 9. Various methods may be employed as the method of transmitting the CP length identifier. In the current LTE specification, for example, control information called Downlink Control Information (DCI) regarding a modulation level to be used for data transmission and an error correction coding rate is included in the data parts of a desired number (e.g., 1 to 4) of blocks (in a case of OFDM, the "block" herein is correctly called an "OFDM symbol") from the top of the subframe and this control information is then transmitted. Based on this technique, a field called "CP length identifier field" is, for example, added to the DCI. Then the controller 12 of the base station 10 includes the CP length identifier in the "CP length identifier field" of the DCI and the communication unit 11 transmits this DCI. Accordingly, the base station 10 is able to set, in the variable manner, for each subframe, the CP length based on the length of the delay wave of the downlink radio signal between the base station 10 and the terminal 20 to which this subframe has been allocated and send, to the terminal 20, a notification regarding the CP length that has been set.

Upon receiving the control information (in the aforementioned example, DCI including the CP length identifier) from the base station 10, the terminal 20 first demodulates the control information and determines the CP length set in the subframe for the terminal 20 based on the CP length identifier included therein.

Hereinafter, operations of the terminal 20 will be specifically explained. Upon receiving the control information (DCI including the CP length identifier) from the base station 10 by the communication unit 21, the controller 22 of the terminal 20 demodulates the control information and retrieves each information element included in the control information. Next, the controller 22 of the terminal 20 determines the CP length set in the subframe for the terminal 20 based on the CP length identifier among the information elements retrieved from the control information and the CP length correspondence table stored in the storing unit 23 (see FIG. 9). In the following processes, the controller 22 of the terminal 20 performs processing for receiving data or reference signals transmitted later in accordance with the CP length.

As described above, in this embodiment, the base station 10 sets, in the variable manner, for each subframe, the CP length of the CP part of the subframe in accordance with the length of the delay wave of the downlink radio signal between the base station 10 and the terminal 20 to which this subframe has been allocated. The base station 10 further transmits the CP length identifier that identifies the CP length set in the subframe to the terminal 20 to which this subframe has been allocated. Therefore, it becomes possible to reduce, for example, the CP length of the subframe to be allocated to the terminal 20 whose length of the delay wave is short. Accordingly, it is possible to reduce subframe overhead and increase the data length of the data part that can be used for transmission of data or the like, whereby it is possible to improve effective throughput in the whole system.

While the step width of the CP length is set to be 0.015625 µs and the number of steps is set to be four in the CP length correspondence table shown in FIG. 9 in this embodiment, the step width of the CP length and the number of steps are not limited thereto and may be arbitrarily set. Further, while the step width of the CP length has a fixed interval, this configuration is merely an example. If, for example, the lengths of the delay waves are concentrated around a certain value, the intervals of the step widths around this value may be set to finer ones.

Further, in this embodiment, the base station 10 performs, for each subframe, processing for setting the CP length and processing for including the CP length identifier in the control information for transmission. However, the processing for measuring the length of the delay wave may not be performed "for each subframe". The base station 10 may determine the CP length using the most recent result of measuring the length of the delay wave among the results of measuring the length of the delay wave.

(3) Third Embodiment

In the aforementioned second embodiment, the communication unit 11 of the base station 10 transmits the 2-bit CP length identifier to the terminal 20 in the data parts for a desired number of blocks from the top of the subframe. Therefore, the communication unit 11 of the base station 10 needs to transmit the 2-bit CP length identifier for every subframe and the reception characteristic of the control information may be degraded. On the other hand, it can be considered that, in many cases, the length of the delay wave, which is an element when the controller 12 of the base station 10 determines the CP length, is not greatly changed in a short period of time in an actual environment.

In order to solve the aforementioned problem, in this embodiment, a method of transmitting the CP length identifier according to the second embodiment is changed in order to suppress the increase in the control information. The configuration of this embodiment is similar to that of the second embodiment.

Specifically, the controller 12 of the base station 10 measures, when the terminal 20 is connected to the base station 10, the length of the delay wave of the downlink radio signal between the base station 10 and the terminal 20, sets, in the variable manner, the CP length based on the result of the measurement, and adds the CP length identifier corresponding to the CP length that has been set to a connection configuration information to be transmitted to the terminal 20 from the base station 10. In the specification of LTE, for example, a field called "CP length identifier field" is added to a Radio Resource Control (RRC) Connection Setup Request message used as the connection configuration information. Then the controller 12 of the base station 10 includes the CP length identifier in the "CP length identifier field" of the RRC Connection Setup Request message and the communication unit 11 transmits the RRC Connection Setup Request message. Accordingly, at the time of actual data transmission, the base station 10 transmits data in accordance with the CP length set in advance at the time of its connection with the terminal 20 and the terminal 20 may perform data reception processing in accordance with the CP length that has been set in advance.

As described above, in this embodiment, the base station 10 sets, at the time of its connection with the terminal 20, the CP length of the subframe to be allocated to the terminal 20 and includes the CP length identifier in the RRC Connection Setup Request message, which is the connection configuration information for transmission. Accordingly, the processing for setting the CP length and the processing for including the CP length identifier in the control information for transmission performed by the base station 10, which have been executed for each subframe in the second embodiment, become unnecessary. The other effects are similar to those in the second embodiment.

(4) Fourth Embodiment

In the second and third embodiments, the controller 12 of the base station 10 limits the number of users (the number of terminals) multiplexed in one subframe to one.

On the other hand, in this embodiment, the controller 12 of the base station 10 divides the terminals 20 into groups in accordance with the length of the delay wave and one subframe is allocated to the terminals 20 that belong to the same group. Accordingly, while the PAPR by the user multiplication increases, it is possible to secure flexibility of scheduling by allowing the user multiplication. The other effects are similar to those in the second embodiment.

In this embodiment, when dividing the terminals 20 into groups, one or a plurality of thresholds may be set for the length of the delay wave and the terminals 20 may be divided into groups in such a way that the terminals 20 having the lengths of the delay waves in a region separated by the thresholds belong to one group. Further, when one subframe is allocated to a plurality of terminals 20, the communication unit 11 of the base station 10 transmits the CP length identifier of the subframe to all the plurality of terminals 20.

(5) Fifth Embodiment

In the second to fourth embodiments, it is assumed that all the data or the like to be inserted into the subframe are data or the like for a specific terminal 20 (specific user). In the actual cellular system, however, the base station 10 may transmit, in a specific subframe, system information for an unspecified terminal 20 (user) in the cell 10A and all the terminals 20 in the cell 10A may receive this system information. In the radio communication system of LTE, 10 subframes (hereinafter they are referred to as subframes #0 to #9) constitute a radio frame. Among these subframes, a synchronization signal (PSS/SSS: Primary Synchronization Signal/Secondary Synchronization Signal) intended to perform downlink synchronization or information on Physical Broadcast CHannel (PBCH) intended to send a notification regarding the system information specific to the cell 10A is inserted into the subframes #0 and #5. When the technique of varying the CP length described in the second to fourth embodiments is applied also to the subframe into which the information to be transmitted to the unspecified terminal 20 in the cell 10A is inserted in the aforementioned radio communication system, the CP length is set in accordance with the terminal 20 having the longest delay wave. According to this technique, however, overhead cannot be reduced and the effects of the second to fourth embodiments cannot be obtained. Accordingly, in order to apply the technique of varying the CP length described in the second to fourth embodiments to the aforementioned radio communication system, the subframe into which information to be transmitted to an unspecified terminal 20 in the cell 10A is inserted and the other subframes need to behave differently from each other.

To be more specific, first, the following two kinds of subframes are defined:

the subframe that can set the CP length in the variable manner (hereinafter this subframe will be called a first subframe): the subframe into which information for the unspecified terminal 20, such as PSS/SSS, PBCH or the like, is not inserted; and the subframe that cannot set the CP length in the variable manner (hereinafter this subframe will be called a second subframe): the subframe into which information for the unspecified terminal 20, such as PSS/SSS, PBCH or the like, is inserted.

The controller 12 of the base station 10 sets, in the variable manner, in the former first subframe, the CP length in accordance with the length of the delay wave of the downlink radio signal between the base station 10 and the terminal 20 to which this subframe is to be allocated, similar to the second to fourth embodiments. On the other hand, the controller 12 of the base station 10 always fixedly sets, in the latter second subframe, the maximum value (the worst value) of the CP length defined in the radio communication system without making the CP length variable. Therefore, a notification regarding the CP length set in the second subframe needs not be sent to the terminal 20.

As described above, in this embodiment, the base station 10 defines two kinds of subframes, i.e., the first subframe and the second subframe, as the subframes that constitute the radio frame and sets the CP length in the variable manner only in the first subframe into which the information for the unspecified terminal 20 is not inserted. Accordingly, even in an environment in which information for the unspecified terminal 20 is inserted into the subframe, it is possible to employ the technique for varying the CP length described in the second to fourth embodiments.

In this embodiment, the case in which the subframe patterns of the subframes #0 to #9 are determined in advance (e.g., the subframes #0 and #5 among the ten subframes #0 to #9 are the second subframe (CP length is fixed) and the other subframes are the first subframe (CP length is variable)) has been assumed. Therefore, the base station 10 needs not notify the terminal 20 of the subframe pattern.

However, the subframe pattern needs not be determined in advance and may be changed, for example, periodically. In this case, the communication unit 11 of the base station 10 may periodically transmits the current subframe pattern to the terminal 20 as the downlink system information, the communication unit 21 of the terminal 20 may receive the downlink system information, and the controller 22 may perform processing for receiving data or the like in accordance with the downlink system information. In this case, a bitmap having a bit width, which corresponds to the period, may be used as the method of transmitting the subframe pattern. When a notification is sent in a period of 10 ms, for example, a bitmap having a 10-bit bit width is prepared and each bit indicates whether each of 10 subframes is the first subframe or the second subframe. When, for example, the subframes #0, #1, and #5 are the second subframe (CP length is fixed) and the other subframes are the first subframe (CP length is variable) among the subframes #0 to #9, the communication unit 11 of the base station 10 notifies the terminal 20 of a bitmap of 10 bits (1, 1, 0, 0, 0, 1, 0, 0, 0, 0). When the i-th (i=0, 1, . . . , 9) bit is "0" in this bitmap, it means that the subframe #i is the first subframe (CP length is variable). When the i-th bit is "1", it means that the subframe #i is the second subframe (CP length is fixed).

Further, the communication unit 11 of the base station 10 may transmit information for specifying the subframes #0, #1, and #5, which are the first subframe, instead of transmitting the subframe pattern (e.g., transmission of identification information of the subframes #0, #1, and #5 in a desired method).

While the present invention has been described with reference to the embodiments, the present invention is not limited to the aforementioned embodiments. Various changes that can be understood by those skilled in the art may be made on the configurations and the details of the present invention within the scope of the present invention.

While the zero-padding cyclic prefix single carrier transmission scheme has been used as the communication scheme in the aforementioned embodiments, the present invention is not limited thereto. The null cyclic prefix single carrier transmission scheme or another single carrier transmission scheme may be applied. When, for example, the present invention is applied to the null cyclic prefix single carrier transmission scheme, the CP length of the CP part in the block can be reduced although there is no change in the length of the block constituting the subframe. It is therefore possible to reduce subframe overhead and to improve throughput.

Further, in the aforementioned embodiments, the communication unit 11 of the base station 10 transmits the CP length identifier corresponding to the CP length, i.e., the absolute value of the CP length, to the terminal 20 as the identification information for identifying the CP length that has been set in the subframe in the variable manner by the controller 12. However, the communication unit 11 may transmit a relative value, which indicates the difference between the CP length that has been set in the subframe in the variable manner by the controller 12 and the CP length that is currently set in the terminal 20. In this case, the initial value of the CP length set in the terminal 20 can be determined to be the maximum value (the worst value) or the like of the CP length defined in the radio communication system in advance. Alternatively, a notification regarding the initial value of the CP length set in the terminal 20 may be sent from the base station 10 via the RRC Connection Setup Request message at the time of connection between the base station 10 and the terminal 20. In this case, a notification regarding the relative values of the following CP lengths may be sent by DCI.

This application is based upon and claims the benefit of priority from Japanese Patent Application No. 2015-071617, filed on Mar. 31, 2015, the disclosure of which is incorporated herein in its entirety by reference.

REFERENCE SIGNS LIST

10 BASE STATION
10A CELL
11 COMMUNICATION UNIT
12 CONTROLLER
13 STORING UNIT
20-0-20-3 TERMINAL
21 COMMUNICATION UNIT
22 CONTROLLER
23 STORING UNIT

The invention claimed is:

1. A method performed by a terminal which communicates with a base station, the method comprising:
receiving a RRC message from the base station, the RRC message including first identification information indicating an initial cyclic prefix length of a first cyclic prefix part to be inserted into a first plurality of blocks which constitutes a first subframe;
determining the initial cyclic prefix length of the first cyclic prefix part to be inserted into the first plurality of blocks based on the first identification information;
receiving second identification information from the base station after receiving the RRC message, the second identification information identifying a cyclic prefix length of a second cyclic prefix part to be inserted into a second plurality of blocks which constitutes a second subframe; and
determining the cyclic prefix length of the second cyclic prefix part to be inserted into the second plurality of blocks based on the second identification information,
wherein each of the first plurality of blocks includes the first cyclic prefix part and a data part being inserted either before or after the first cyclic prefix part,
wherein each of the second plurality of blocks includes the second cyclic prefix part and a data part that is inserted either before or after the second cyclic prefix part,
wherein the second identification information is included in control information, and
wherein the control information is DCI (Downlink Control Information).

2. The method according to claim 1,
wherein the control information is transmitted at an arbitrary number blocks from a top of the first subframe in the data part.

3. The method according to claim 1,
wherein the first subframe is a subframe for a downlink communication which does not transmit PSS/SSS (Primary Synchronization Signal/Secondary Synchronization Signal) and PBCH (Physical Broadcast CHannel).

4. The method according to claim 1, wherein the initial cyclic prefix length is different than the cyclic prefix length identified by the second identification information.

5. The method according to claim 1, further comprising:
transmitting the first subframe to the base station, the first cyclic prefix part of each of the first plurality of blocks having the initial cyclic prefix length; and
transmitting a second subframe to the base station, the second cyclic prefix part of each of the second plurality of blocks having the cyclic prefix length identified by the second identification information.

6. The method according to claim 1, wherein a table is commonly stored in the terminal and the base station, the table indicating the first identification information in association with a first CP length and the second identification information in association with a second CP length,
wherein the determining the initial cyclic prefix length comprises referencing the table and identifying the first CP length associated with the first identification information, and
wherein the determining the cyclic prefix length identified by the second identification information comprises referencing the table and identifying the second CP length associated with the second identification information.

7. The method according to claim 1, further comprising receiving third identification information from the base station after receiving the second identification, the third identification information identifying a cyclic prefix length of a third cyclic prefix part to be inserted into a third plurality of blocks which constitutes a third subframe; and
determining the cyclic prefix length of the third cyclic prefix part to be inserted into the third plurality of blocks based on the third identification information,
wherein the third identification information is included in DCI.

8. The method according to claim 7, wherein a table is commonly stored in the terminal and the base station, the table indicating the first identification information in association with a first CP length, the second identification information in association with a second CP length and the third identification information in association with a third CP length,
  wherein the determining the initial cyclic prefix length comprises referencing the table and identifying the first CP length associated with the first identification information,
  wherein the determining the cyclic prefix length of the second cyclic prefix part comprises referencing the table and identifying the second CP length associated with the second identification information, and
  wherein the determining the cyclic prefix length of the third cyclic prefix part comprises referencing the table and identifying the third CP length associated with the third identification information.

9. A method performed by a base station which communicates with a terminal, the method comprising:
  including first identification information in an RRC message, the first identification information indicating an initial cyclic prefix length of a first cyclic prefix part to be inserted into a first plurality of blocks which constitutes a first subframe;
  transmitting the RRC message to the terminal; and
  transmitting second identification information to the terminal after transmitting the RRC message, the second identification information identifying a cyclic prefix length of a second cyclic prefix part to be inserted into a second plurality of blocks which constitutes a second subframe,
  wherein each of the first plurality of blocks includes the first cyclic prefix part and a data part that is inserted either before or after the first cyclic prefix part,
  wherein each of the second plurality of blocks includes the second cyclic prefix part and a data part that is inserted either before or after the second cyclic prefix part,
  wherein the second identification information is included in control information, and
  wherein the control information is DCI (Downlink Control Information).

10. The method according to claim 9,
  wherein the control information is transmitted at an arbitrary number blocks from a top of the first subframe in the data part.

11. The method according to claim 9,
  wherein the first subframe is a subframe for a downlink communication which does not transmit PSS/SSS (Primary Synchronization Signal/Secondary Synchronization Signal) and PBCH (Physical Broadcast CHannel).

12. The method according to claim 9, wherein the initial cyclic prefix length is different than the cyclic prefix length identified by the second identification information.

13. The method according to claim 9, further comprising:
  receiving a first subframe from the terminal, the first cyclic prefix part of each of the first plurality of blocks having the initial cyclic prefix length; and
  receiving a second subframe from the terminal, the second cyclic prefix part of each of the second plurality of blocks having the cyclic prefix length identified by the second identification information.

14. The method according to claim 9, wherein a table is commonly stored in the terminal and the base station, the table indicating the first identification information in association with a first CP length and the second identification information in association with a second CP length.

15. The method according to claim 9, further comprising transmitting third identification information to the terminal after transmitting the second identification, the third identification information identifying a cyclic prefix length of a third cyclic prefix part to be inserted into a third plurality of blocks which constitutes a third subframe,
  wherein the third identification information is included in DCI.

16. The method according to claim 15, wherein a table is commonly stored in the terminal and the base station, the table indicating the first identification information in association with a first CP length, the second identification information in association with a second CP length and the third identification information in association with a third CP length.

* * * * *